US006633811B1

(12) United States Patent
Aumayer

(10) Patent No.: US 6,633,811 B1
(45) Date of Patent: *Oct. 14, 2003

(54) METHOD OF AUTOMATICALLY ADJUSTING A VEHICLE SPEED DISPLAY ACCORDING TO VEHICLE LOCATION

(75) Inventor: Richard Aumayer, Diekholzen (DE)

(73) Assignee: Robert Bosch GmbH, Stuttgart (DE)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/692,605

(22) Filed: Oct. 19, 2000

(30) Foreign Application Priority Data

Oct. 19, 1999 (DE) .......................... 199 50 156

(51) Int. Cl.⁷ ............................. G08G 1/09; B60Q 1/54; B61L 27/00
(52) U.S. Cl. ..................... 701/207; 701/93; 701/110; 180/170
(58) Field of Search ................... 701/207, 208, 701/93, 110, 200, 117, 121, 213; 123/351; 180/170, 171; 340/539, 441, 905, 936

(56) References Cited

U.S. PATENT DOCUMENTS

| | | | | |
|---|---|---|---|---|
| 3,656,099 A | * | 4/1972 | Campbell | 340/62 |
| 3,686,628 A | * | 8/1972 | Keller et al. | 340/53 |
| 5,364,047 A | * | 11/1994 | Petit et al. | 246/122 R |
| 5,412,573 A | * | 5/1995 | Barnea et al. | 364/449 |
| 5,485,161 A | * | 1/1996 | Vaughn | 342/357 |
| 5,731,978 A | * | 3/1998 | Tamai et al. | 364/444.1 |
| 6,163,277 A | * | 12/2000 | Gehlot | 340/905 |
| 6,246,948 B1 | * | 6/2001 | Thakker | 701/93 |

FOREIGN PATENT DOCUMENTS

| | | |
|---|---|---|
| DE | 32 03 357 A1 | 8/1983 |
| DE | 37 00 552 A1 | 7/1988 |
| DE | 44 30 169 A1 | 2/1996 |
| DE | 196 15 249 A1 | 10/1997 |
| DE | 298 20 659 U1 | 7/2000 |

OTHER PUBLICATIONS

Prof. DR.–ING. Claus Reuber: "Verkehrstelematik: Noetiger Denn JE.." Elektronik 24/1997, pp. 64–67.
Patent Abstracts of Japan 07–182598 of Jul. 21, 1995.
Patent Abstracts of Japan 11–268554 Oct. 5, 1999.
Patent Abstracts of Japan 11–115546 of Apr. 27, 1999.
Patent Abstracts of Japan 11–142190 of May 28, 1999.

* cited by examiner

*Primary Examiner*—Tan Nguyen
*Assistant Examiner*—Dalena Tran
(74) *Attorney, Agent, or Firm*—Michael J. Striker

(57) ABSTRACT

The method for displaying speed variables in a motor vehicle includes automatically selecting and displaying one of a number of different possible speed scales on a speedometer according to the physical units for speed values employed at the current location of the vehicle. An acoustic and/or optical alarm signal is produced when the vehicle passes from one governmental region in which one set of physical units is used to another in which a different set is used. In addition, speed limits at the current location may be displayed on the speed scale itself by highlighting an appropriate scale mark or producing a scale mark of a different length or color. The current location may be obtained from an on-board GPS. The speed limits and physical units for speed values at the current location are retrieved from a data storage media according to that location. The speed limits may be updated by radio connection. Digital display devices for speed values with similar features are disclosed.

43 Claims, 4 Drawing Sheets

METHOD OF AUTOMATICALLY ADJUSTING A VEHICLE SPEED DISPLAY ACCORDING TO VEHICLE LOCATION

BACKGROUND OF THE INVENTION

1. Field of the Invention

The present invention relates to a method of automatically adjusting displayed data, especially vehicle speed data, in a vehicle with a combined instrument and, more particularly, to a method of displaying vehicle speed information in a vehicle that takes account of changes in vehicle location and speed variable units between regions in which the vehicle is travels.

2. Prior Art

It is already well known to display the actual speed of a vehicle and with it the maximum speed for many localities, for example 50 km/hr, on a display device in the vehicle. This display occurs, e.g. by a red mark or a red bar, which is put on the scale of the display device, so that the speed scale value of 50 km/hr is specially marked for a user of the vehicle. Furthermore it is possible to provide special markings on the vehicle speed scale at certain special vehicle speed values, such as a maximum speed of 30 km/hr in residential areas or of 130 km/hr as posted or recommended speed on the autobahn in Germany or on an expressway. If the user of the vehicle now drives the vehicle into a different country, generally different values are used for the speed limits for the various classes of roads and streets in the different country. Furthermore even the physical units of the speed limits, which are posted on signs, may be different. For example, speed limits may be in miles per hour instead of kilometers per hour. Thus it becomes difficult for the user of the vehicle to correlate the actual speed of the vehicle with the allowed speed limits. Primarily the speed limits from the country in which the vehicle originated or from which the vehicle traveled remain emphasized on the display device and can irritate the driver of the vehicle, since they are no longer applicable. Furthermore it is also known in the art to provide a speed scale on the display device in several different physical units, for example miles per hour and kilometers per hour. The user of the vehicle must then determine the actual speed value indicated on the display device by selecting the correct physical units based on his knowledge of the region in which the vehicle is located. Furthermore he may be irritated by marked speed limits on the display device that are not applicable to the region in which the vehicle is currently located. This is also true when there is no change in the physical units by which speed values are displayed but only a change in the allowed maximum speed limits.

SUMMARY OF THE INVENTION

It is an object of the present invention to provide a method of automatically adjusting vehicle speed values displayed in a vehicle according to vehicle location, i.e. according the particular governmental region or country through which the vehicle is currently traveling.

According to the invention the method of displaying speed information in a vehicle, especially a motor vehicle, includes the steps of:

a) determining a current actual position of the vehicle with a positioning device;

b) locating the current actual position of the vehicle determined in step a) on a digital map;

c) identifying a region, such as state, country or city area, in which the current actual position is located on the digital map; and d) displaying automatically on a display device at least one of an actual current speed of the vehicle and allowed speed limits in the region for at least one type of road or street in physical units used in the region identified in step c).

The method according to the invention with the features of the appended claims has the advantage that the driver is always informed regarding the actual vehicle speed, without requiring him or her to select between speed scale values in two different physical units. Because of this feature of the invention it is easy for the driver to react to traffic signs, which indicate speed limits. The actual speed of the vehicle is then always displayed by the display device with the physical units for speed that are used in the region or area in which the vehicle is is currently located. Furthermore in preferred embodiments of the method the driver is informed of the optimum maximum speed for certain street or road types in the region through which the vehicle is traveling. Irritation of the driver caused by display of a maximum speed or speed limit on the speed scale which is in units that are not used in the region in which the vehicle is located is therefore avoided. Furthermore the claimed method is advantageous for the manufacture of speed display devices used in the vehicle, since different display devices are not required to provide country-specific speed units and country-specific speed limits for different countries. Different speed physical units and speed limits are automatically displayed with the same display device coupled with e.g. a global positioning device.

Preferred embodiments of the method with advantageous additional features are described hereinbelow and claimed in the appended claims.

It is especially advantageous if an acoustic and/or optical warning signal is produced when the display of the actual vehicle speed and/or the speed limits or maximum allowed speed values changes. The user of the vehicle is thus signaled that he should now consider another speed limit and/or other physical units being used in the region in which the vehicle is now currently located. Furthermore the warning signal avoids a sudden and unexpected change of the speed display that could otherwise confuse the driver.

It is further provided in preferred embodiments of the method that the display of the actual vehicle speed and/or the allowed maximum speed values occurs in a display device that comprises a freely programmable combined instrument. This combined instrument advantageously comprises a display screen so that the method according to the invention can be performed without mechanical or structural arrangements, for example not a speedometer with a pointer, with which speed values are indicated.

Preferred embodiments of the method according to the invention also advantageously include updating the speed limit data stored in the vehicle by means of a radio connection of by means of a data carrier. Then since allowed maximum speed values can change in certain region or also the position of region boundaries can change, it is also possible to update stored data in order to permit the display of the correct speed limits.

In a preferred embodiment of the method according to the invention whether or not a region boundary has been crossed by the vehicle is tested more frequently in a border zone for the region than in the central part of the region. When the vehicle is located within the region in an area outside of the border zone, passing over the region border or boundary is very unlikely in a certain predetermined time interval. A frequent test or inquiry into whether or not the vehicle has crossed over the region boundary is thus not required and takes unnecessary processor capacity when the vehicle is located in the central part of the region. In contrast a region change is much more likely in a border zone of the region in which the vehicle is currently located, so that more frequent testing to determine which region the vehicle is located in is required. According to this preferred embodiment of the invention then the change of the display of the actual vehicle speed and region speed limits is possible more rapidly in response to a change of the region in which the vehicle is located.

It is also advantageous when the display of the actual vehicle speed and/or the speed limits occurs according to the type, conditions and characteristics of the vehicle. Thus different maximum permitted speeds can be displayed by the display device according to the vehicle weight, engine size and trailer operation, so that the vehicle is not driven too fast by the driver.

Furthermore in a preferred embodiment of the method the driver is informed of the speed limit for the type of road or street on which the vehicle is currently traveling. Thus the driver does not need to make a decision regarding the type or class of the street or road on which the vehicle is traveling currently himself or herself in order to know the speed limit.

It is advantageous particularly to provide the acoustic and/or optical warning signal to the driver as soon as he or she exceeds the current maximum permitted speed in the region through which the vehicle is passing. Because of this feature of the method unintended speeding at speeds above the speed limit because the driver does not observe the speed display device is prevented.

BRIEF DESCRIPTION OF THE DRAWING

The objects, features and advantages of the invention will now be illustrated in more detail with the aid of the following description of the preferred embodiments, with reference to the accompanying figures in which.

DESCRIPTION OF THE PREFERRED EMBODIMENTS

Figure 1A:
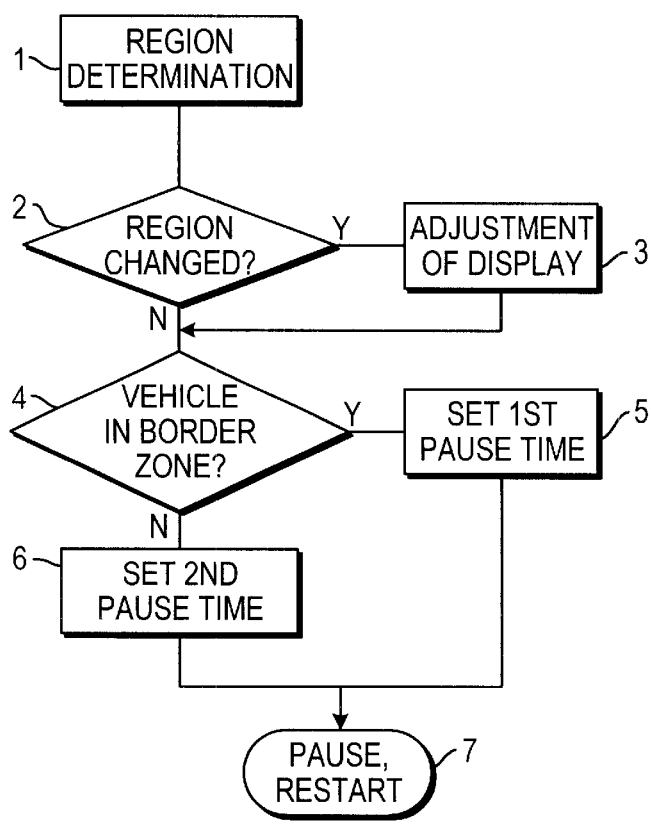
FIG. 1*a* is a flow chart of the overall or general steps of the method according to the invention for display of speed information in a vehicle.

One embodiment of a method for display of speed information in a vehicle is shown in FIG. 1*a*. The region or area in which the vehicle is located is determined in locating step 1. This region or area can be, for example, a state, a country or a city or metropolitan region, in which respective predetermined speed limits exist for corresponding road or street types. Furthermore, parts of the region or area may have special speed limits, for example the so-called tempo-30-zones or work zones. A first decision step 2 occurs following the locating step 1. Whether or not the vehicle has crossed the boundary of the region or area in which the last test was performed is tested in the first decision step 2. If the vehicle has crossed a region boundary or if there is no current region or area in memory, for example, if it is the first time that the method according to the invention is being performed, the method branches to adjustment step 3. An adjustment of the display device for display of the actual vehicle speed and/or the allowed speed limits occurs in the adjustment step 3. After the adjustment step 3 the method proceeds or branches to a second decision step 4. Like the first decision step 2 the second decision step 4 branches according to whether or not the region boundaries in which the vehicle is traveling have been crossed. With the aid of the position of the vehicle determined in the locating step 1 in the second decision step 4 whether or not the vehicle is in a boundary zone of the region or area is determined. If that is the case, then the method branches to the method step 5. In the method step 5 a first time interval (pause) is established, after which the method according to the invention is restarted the next time. This first time interval is dependent on the size of the boundary zone and the average speed of the vehicle passing through it. Since a vehicle navigation device performs the locating step 1 and also the navigation process for the driver of the vehicle, the entire process according to the invention can frequently also be performed by this device, when the vehicle navigation requires frequent position determination. When it is established in the second decision step that the vehicle is not located in a boundary zone of the region, a second time interval or pause is set up in step 6 which is greater than the first time interval. For a vehicle, which e. g. moves outside of a strip of 15 km from the boundary, performing the method according to the invention after a second time interval of about 15 minutes is sufficient for the purpose of adjusting the display device. Within a boundary zone of 15 kilometers, e.g. a testing after a first time interval of about one minute is sufficient. After the first method step 5 and the second method step 6 the method ends with the halt or a pause and restart after the previously set up first and/or second time interval in step 7.

Figure 1B:
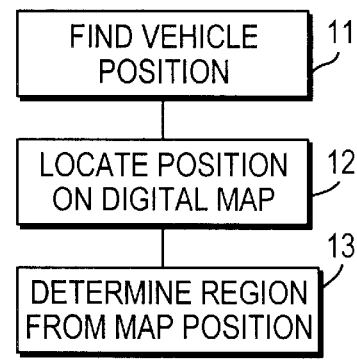
FIG. 1*b* is a flow chart showing details of a vehicle position determining part of the method shown in FIG. 1*a* according to the invention.

The locating step 1 is shown in further detail in FIG. 1*b*. For example, a GPS locating device and/or a composition navigate device determines the geographic position of the vehicle in a first position-determining step 11, e.g. from GPS satellite signals. In a second position-locating step 12 this determined vehicle position is located on a digital map or chart that includes region boundaries, which is present in the memory in the vehicle. Finally the region in which the vehicle is located is determined from the position of the vehicle located on the digital map in a region-determining step 13. Then the particular physical units for speed values and speed limits for that region are retrieved or otherwise obtained.

Figure 1C:
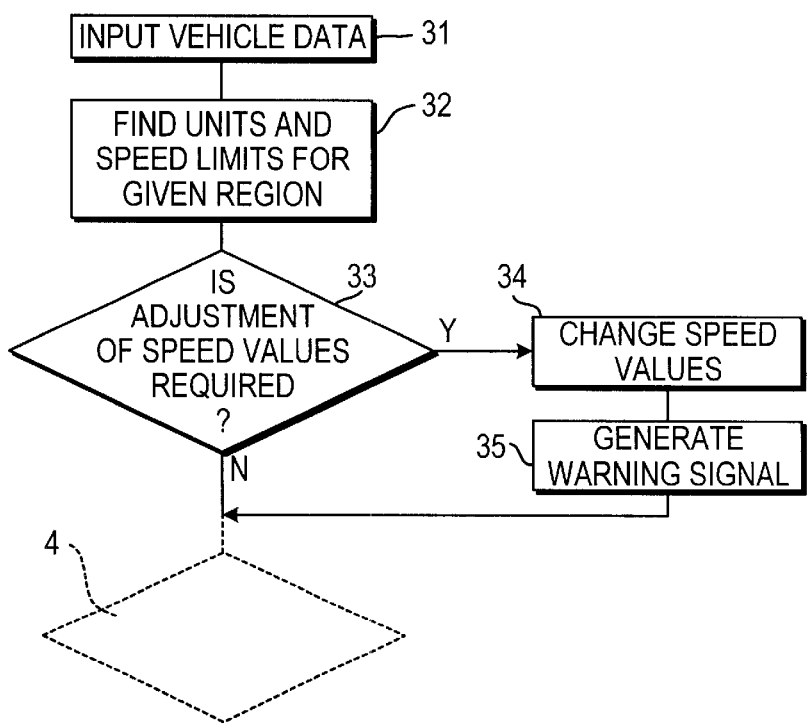
FIG. 1*c* is a flow chart showing details of the display device adjustment part of the method shown in Fig. 1*a*.

The display adjustment 3 performed in the method according to the invention is shown in more detail in FIG. 1*c*. Data regarding the vehicle, such as weight, engine size or whether or not a trailer is attached, are transmitted in a first step 31. The physical units for speed values and the speed limits for different classes of roads or streets in the region in which the vehicle is located are determined in a second step 32, considering the vehicle data transmitted in the first step. The physical units for speed values and the speed limits are stored in a memory unit in the vehicle. In a third step 33, a decision step, whether or not a current adjustment of the actual displayed vehicle speeds or the speed limits is required is tested. If an adjustment is required, the representation of the speed in the display device in the appropriate physical units is changed into the appropriate physical units in step 34. Moreover at least one maximum speed is displayed in the display device, which is the speed limit for a particular type of street or road, so that e.g. the maximum permitted speed is 50 km/hr in places in Germany. Subsequently a warning or signaling step 35 occurs. By acoustic or optical warning the driver is advised that the display of the actual vehicle speed and/or the allowed maximum speed for at least one road class has changed. The driver might otherwise be confused by a sudden change of the display without warning. This is avoided by including the warning step 35 in the method according to the invention. After the warning step 35 the method branches or proceeds to the decision step 4 shown in FIG. 1 a. Since the second decision step is already shown in FIG. 1a, it is only indicated with dashed lines in FIG. 1c. The second decision step 4 is also reached from the third decision step 33 when no changes in the display are required.

Figure 2A:
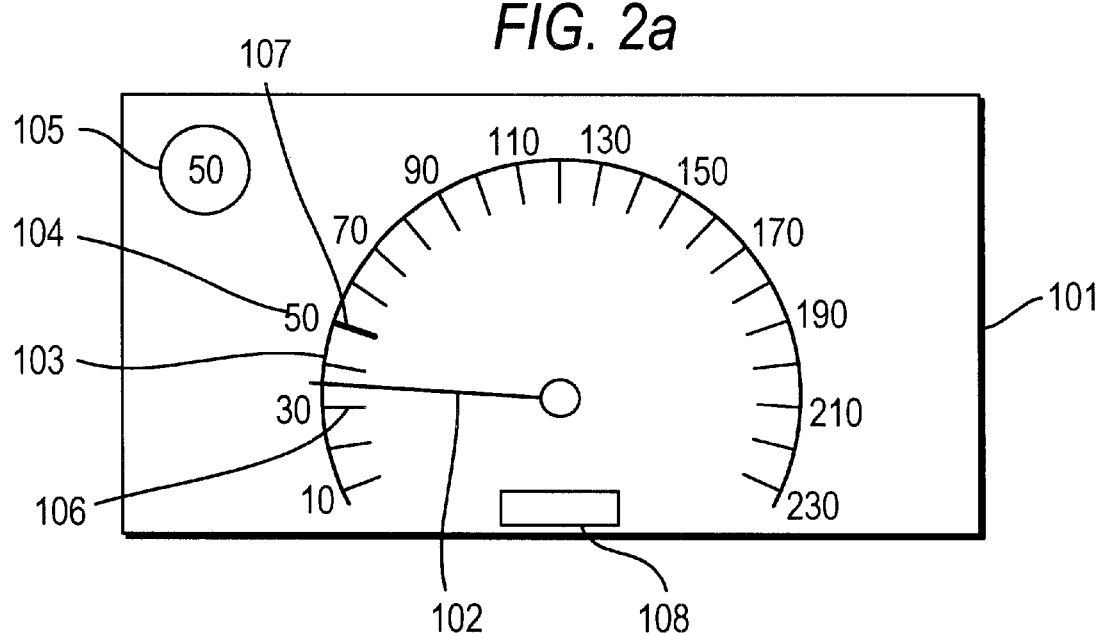
FIGS. 2*a*, 2*b*, 2*c* and 2*d* are action views of a display device illustrating the method according to the invention for display of speed information in the vehicle.

A speed display device 101 in a motor vehicle including a speedometer is shown in FIG. 2a. A first scale 103 with scale values 104 and first scale marks or divisions 106 are shown on the display 101 in FIG. 2a. Only one scale value 10 104 and one first scale division 106 are designated with respective reference numbers in FIG. 2a for convenience and simplicity. A second scale mark 107 is especially emphasized by making it longer and wider than the first scale marks 106. Furthermore for that purpose the scale mark 107 can be in a different color, for example red, yellow or orange, from the color of the scale marks 106, which e.g. can be white, as the sole emphasizing means or as a highlighting means.

The display of speed values on the first scale 103 occurs by means of a pointer or hand 102, which can move over the entire first scale 103. A physical unit indicator 108 shows the physical units for the speeds indicated by means of the pointer 102. For example, the indicated unit could be "km/hr". A first maximum speed or speed limit symbol 105 is also displayed on the display device 101. A driver of the vehicle is informed of the speed limit of 50 km/hr both by the second scale mark 107 and by the first speed limit symbol 105. The display of the second scale mark 107 and the first speed limit symbol 105 can occur permanently in a region in which a maximum speed or speed limit of 50 km/hr exists for a particular class of streets, e.g. all inner city streets. Thus it is completely possible to designate the maximum posted speed by an additional display or blending in of a symbol not shown in the figures for "city" or "locality", so that it is apparent for the directly that the street class "inner city" streets are designated. Furthermore it is also possible that then only one type of display occurs when the vehicle is located in a closed built-up region and the maximum speed there is 50 km/hr. This type of display is also possible for other road or street classes, thus e.g. for an express way or limited access high-speed highway.

Figure 2B:
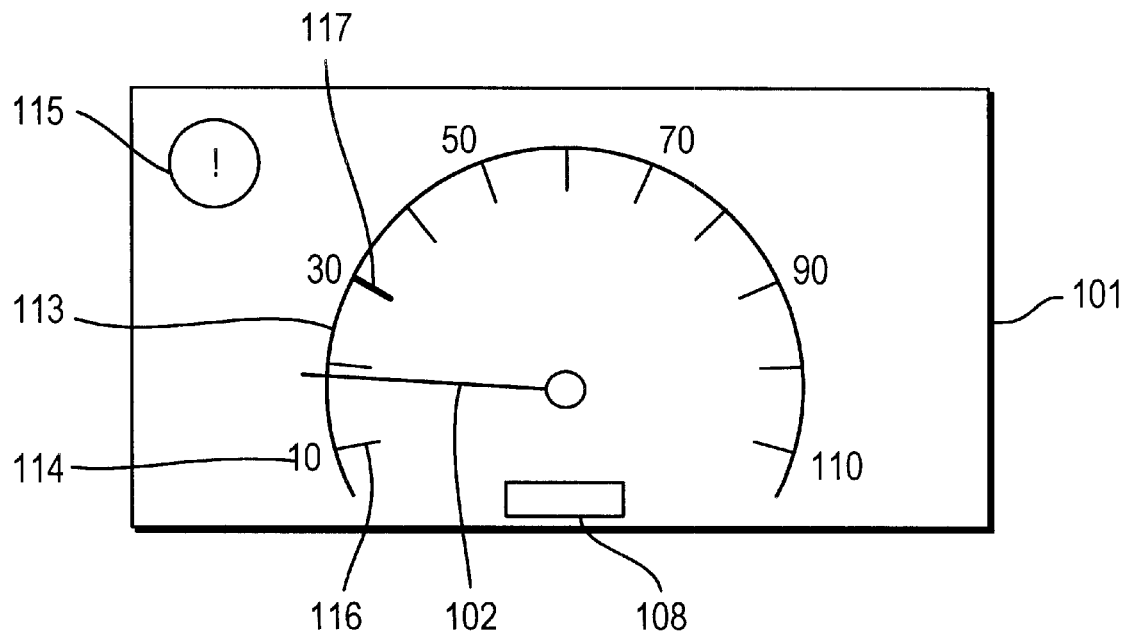
Figure 2C:
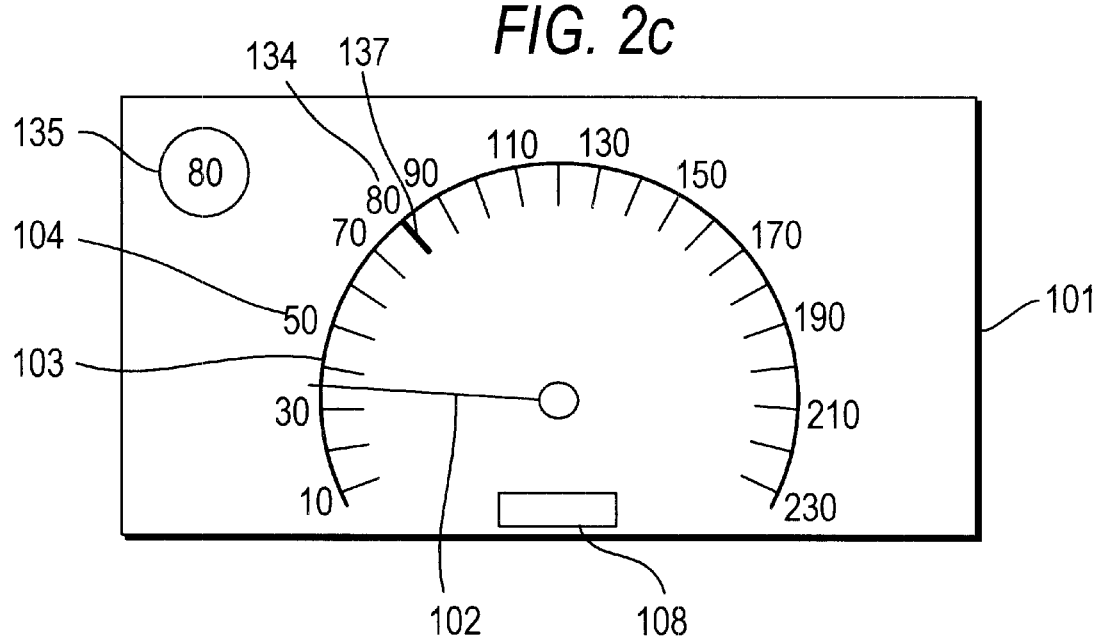
Figure 2D:
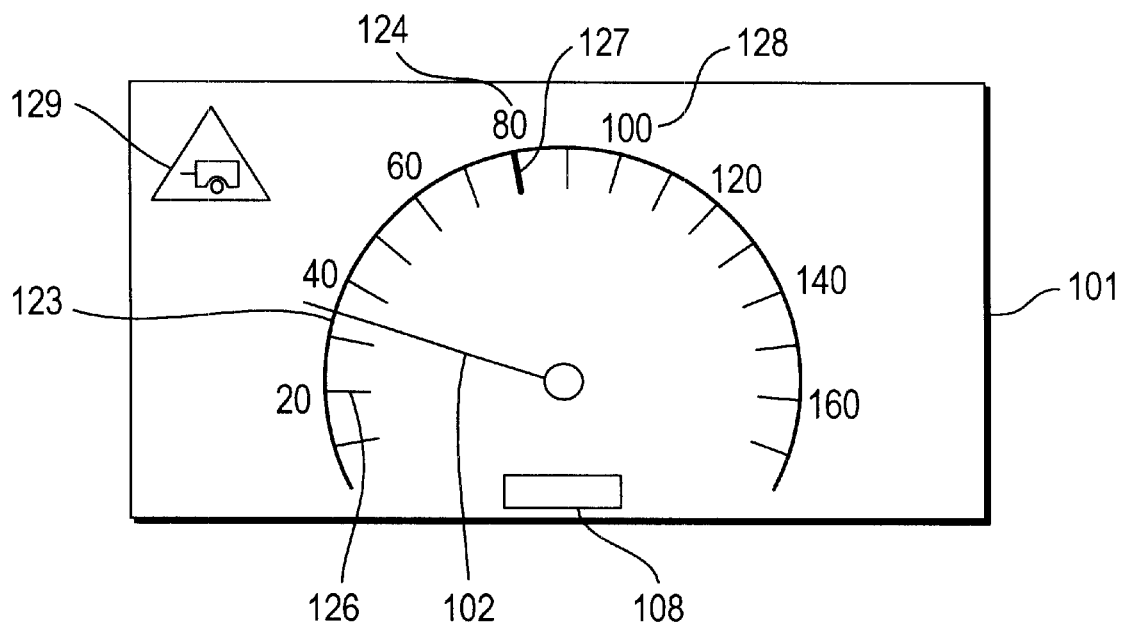

Different views of the display device 101 are shown in FIGS. 2b to 2d. The respective views differ from that of FIG. 2a according to the method of the invention, but the same reference characters for the same elements.

The displace device 101 shown in FIG. 2b is in a state in which the physical units for the speed of the vehicle have changed to miles per hour since the vehicle has moved to a region in which those units are used. Furthermore now the speed limit in this area is 30 mph for the inner city. A second scale 113 with scale values 114 and first scale mark 116 as well as a second scale mark 117 is now shown on the display device (which of course is different from the first scale shown in FIG. 1a because of the change of units). The second scale mark 117 is now located on an appropriate place on the second scale 113. The unit symbol "mph" is now displayed in the physical unit indicator 108. Furthermore a warning symbol 115 is observable in the display device 101, which notifies the driver of the change in the illustrated variables on the display device 101. After a predetermined time, e.g. after about five minutes, the method assumes that the driver has been made aware of the change and thus the warning symbol is then turned off.

The display device 101 shown in FIG. 2c displays a speed limit of 80 km/hr since according to FIG. 2a a change in the region has taken place. The physical unit indicator 108 in this case remains unchanged from that in FIG. 2a. A second speed limit symbol 135 and a second scale value 134 however are now displayed. Furthermore a second scale mark 137 appears at a suitable location in the first scale 103. In addition to the change of the display device a warning tone or sound is produced which signals the driver that the speed limit has changed as a result of the change of the region in which the vehicle is located.

A third scale 124 with a first scale mark 127 and an associated first scale value 128 is shown on the display device 101 in FIG. 2d. Furthermore a second scale value 124 and an associated second scale mark 127 are highlighted or emphasized, for example, by use of a color for them that is different from that used for the remainder of the display device, by enlargement and/or by widening them. A trailer symbol 129 is also visible in the display device 101. A trailer would be detected when the vehicle data was tested and the display device 101 would then indicate the trailer symbol 129. The third scale 123 would be adjusted, especially in regard to the scale values of the third scale, in this embodiment to a now current speed limit of 80 km/hr. The speed limit is highlighted or emphasized by the second scale mark 127. The expansion of the scale provides the user with an improved readability for reading the actual vehicle speed. The scale expansion is permitted since the vehicle with the trailer most probably does not exceed the maximum permitted speed by about more than twice. A suitable change in a display device, as is shown in FIG. 2d, can then occur when the regions change. This change in the display device occurs when the vehicle moves from one region, in which there is no special speed limit provided for a vehicle with a trailer, e.g. within work area, in which the speed limit is the same for all vehicle, e.g. 10 km/hr to 25 km/hr, into a region, in which a special speed limit is provided for a vehicle with a trailer.

If the highlighted or emphasized speed as shown in FIGS. 2a to 2d is exceeded, thus an optical and/or acoustic warning can be generated for the driver, considering predetermined speed tolerance limits.

Figure 3:
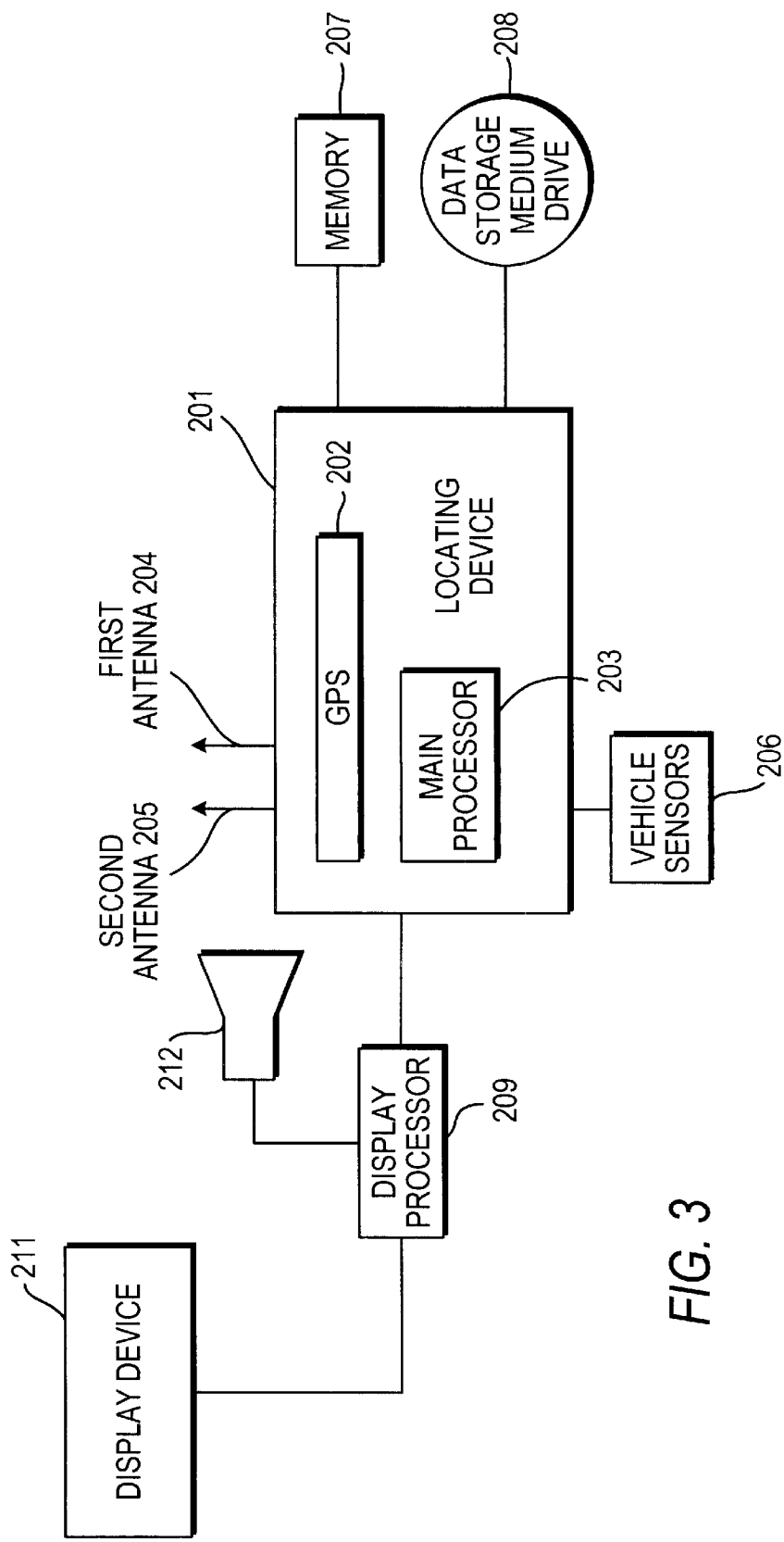
FIG. 3 is a block diagram of a device for performing the method according to the invention for display of speed information in a vehicle.

An apparatus for performing the method according to the invention is shown in FIG. 3. A vehicle locating device 201 comprises a vehicle position determining device 202, which evaluates data which it receives via a first radio antenna 204 or by means of vehicle sensors 206. The position determining device 202 preferably is at least temporarily connected with GPS satellites by means of the first radio antenna 204. Furthermore the locating device 101 is connected with a main processor 203, a memory 207, a data storage means drive 208 and a second radio antenna 205. The locating device 201 is also connected with a display device 211 by a display processor 209 for the displayed information. The display processor 209 for the displayed information is also connected to a loud speaker 212.

The locating device 201 can e.g. be part of a navigation system, which is already present in a vehicle and need not be additionally installed for the method according to the invention. The position determining unit 202 calculates the current geographic position of the vehicle from the data provided by the GPS satellites, which the locating device 201 receives via the first radio antenna 204. The region or area (having the same predetermined speed limits and/or physical units for speed values) is determined from the current geographic position of the vehicle by means of a digital map. The digital map correlates respective geographic positions with corresponding regions or areas and is stored in the memory 207. The memory 207 can similarly be a hard disk or a CD drive. The main processor 203 now determines the data, which are relevant for the speed display device, by means of vehicle sensors 206. For example, besides the actual vehicle speed, whether or not a trailer is attached, whether or not fog lights are lit and whether or not chains are being used are also relevant data. If these latter conditions exist, special speed limits for the vehicle are provided. Furthermore the main processor 203 determines which physical units are used for the vehicle speed values from the location of the vehicle on the digital map. Furthermore the main processor 203 determines the speed limits for the individual classes of streets and roads in the region in which the vehicle is located, i.e. the speed limits for the express way or freeway, high speed highway, country road, residential street or inner city street. The vehicle data received from the vehicle sensors 206 are considered. These data are input to the display processor 209, which especially controls the display device 211. When a change of the display occurs, an acoustic warning is generated by means of the loud speaker 212. The display device 211 now may show a changed speed scale, changed scale values, changed physical units as well as additional warning symbols and/or speed limit symbols. The display device 211 comprises a display controller and a display medium, for example a display screen provided by a liquid crystal display device, a plasma screen or a cathode ray tube. The embodiments with the display screen permit a very simple change of the display by means of the method according to the invention, since the display device 211 only needs to show a different image in the display screen.

Furthermore it is also possible to use a commercial combined apparatus with mechanical display elements for the display device 211. The control of the pointer 102 must then be adjusted to the suitable physical units shown in the physical unit indicator 108. The physical units are shown in a small display device or by a characteristic illuminated symbol field in the primary display device. For example, a speed limit can be made visible by background lighting in a different color at the scale mark associated with the corresponding speed limit. Warning symbols and/or speed limit symbols can be displayed by means of a plurality of individually controllable symbol fields on the display device.

The speed limit data stored in the memory 207 may be updated by means of the second radio connection 205, so that a driver is not given incorrect information. It is also possible to update the speed limit information by means of a data carrier or storage medium, such as CD. This data carrier would be inserted in a data carrier drive 208. It would store actual information regarding the latest allowed speed limits in various regions, including the physical units for the speed limit values. For the situation in which it is not possible to determine the vehicle location, for example when it is inside of a parking garage, the display device 209 displays information from the display that occurred at the last time when it was possible to determine the location of the vehicle.

The term "region" means an area of the earth having governmentally defined boundaries over which the vehicle may travel and in which at least the governmentally prescribed physical units of speed values are the same and in preferred embodiments the speed limits on the same type of streets or roads are the same.

The disclosure in German Patent Application 199 50 156.4-51 of Oct. 19, 1999 is incorporated here by reference. This German Patent Application describes the invention described hereinabove and claimed in the claims appended hereinbelow and provides the basis for a claim of priority for the instant invention under 35 U.S.C. 119.

While the invention has been illustrated and described as embodied in a method of automatically adjusting a vehicle speed display according to vehicle location, it is not intended to be limited to the details shown, since various modifications and changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed is new and is set forth in the following appended claims.

I claim:

1. A method of displaying speed information in a vehicle, said method comprising the steps of:

a) providing in the vehicle a display device for displaying vehicle speeds in one of a plurality of different physical units for speed values and means for automatically selecting the one of the different physical units used to display said vehicle speeds on said display device;

b) determining a current actual position of the vehicle with a positioning device located in the vehicle;

c) locating the current actual position of the vehicle determined in step a) on a digital map, said digital map covering a plurality of governmental regions, said physical units remaining the same throughout each of said governmental regions and said digital map covering at least two of said governmental regions in which different ones of said physical units for said speed values are used;

d) identifying the governmental region in which the current actual position of the vehicle is located in order to ascertain which of said physical units for said speed values is in use at said current actual position;

e) automatically selecting the one of said physical units for displaying said speed values from among said plurality of said physical units according to said governmental region identified in the identifying step d) by means of said means for automatically selecting provided in step a);

f) displaying an actual current speed of said vehicle on said display device in said one of said different physical units for displaying said speed values selected in step e); and g) displaying said physical units for said speed values displayed in steps e) and f) on said display device;

whereby said actual current speed may be read off said display device in said physical units for said speed values used in said governmental region and thus driver confusion because of changes of said physical units for said speed values occurring when traveling between different governmental regions is avoided.

2. The method as defined in claim 1, wherein said governmental region is a state, country or city area.

3. The method as defined in claim 1, further comprising generating at least one of an acoustic warning signal and an optical warning signal to signal when said physical units used to display said speed values on said display device change.

4. The method as defined in claim 1, further comprising the step of displaying on the display device at least one speed limit for at least one type of road or street in the governmental region in which the current actual position of the vehicle is located in said physical units used in said governmental region.

5. The method as defined in claim 4, further comprising storing values for said at least one speed limit for said at least one type of road or street in said governmental region in which said vehicle is currently located and subsequently updating said at least one speed limit for said at least one type of road or street by means of a radio connection or by means of data carrier.

6. The method as defined in claim 4, wherein said at least one speed limit displayed on said display device differs according to a type or characteristics of said vehicle.

7. The method as defined in claim 4, wherein said at least one speed limit displayed on said display device depends on vehicle weight or engine size of said vehicle.

8. The method as defined in claim 4, wherein said at least one speed limit for said at least one type of road or street displayed on said display device depends on whether or not a trailer is towed by said vehicle and according to characteristics of said trailer when said trailer is towed by said vehicle.

9. The method as defined in claim 1, wherein said display device includes a speedometer and said speedometer comprises means for automatically displaying one of a plurality of different possible speed scales and a pointer moving over said one of said speed scales currently displayed on the speedometer in order to indicate said actual current speed of said vehicle in said one of said different physical units.

10. The method as defined in claim 9, wherein at least one speed limit is displayed on said speedometer by highlighting or lengthening a scale mark of said speed scale currently displayed on said speedometer.

11. The method as defined in claim 9, wherein at least one speed limit is displayed on said speedometer by providing at least one scale mark in a different color from other scale marks on said speed scale.

12. The method as defined in claim 1, further comprising more frequently testing whether or not a governmental region boundary of said governmental region has been traversed by the vehicle, when the vehicle is located in a border zone adjacent a border or boundary of said governmental region instead of in a central part of said region.

13. A method of displaying speed information in a vehicle, said method comprising the steps of:
- a) providing in the vehicle a display device for displaying vehicle speed, said display device including means for displaying a vehicle speed scale and a pointer cooperating with said vehicle speed scale to indicate an actual vehicle speed of the vehicle;
- b) determining a current actual position of the vehicle with a positioning device located in the vehicle;
- c) locating the current actual position of the vehicle determined in step b) on a digital map;
- d) identifying a region in which the current actual position of the vehicle is located;
- e) obtaining a current speed limit for said vehicle according to a road or street in said region on which said vehicle is currently located and according to characteristics of said vehicle;
- f) emphasizing a scale mark on the vehicle speed scale in order to indicate the current speed limit on the speed scale; and
- g) indicating the actual vehicle speed on the vehicle speed scale by means of said pointer;
- wherein said characteristics of said vehicle comprise vehicle weight, vehicle engine size and towed trailer characteristics when said trailer is towed by said vehicle.

14. The method as defined in claim 13, further comprising generating at least one of an acoustic warning signal and an optical warning signal when said current speed limit changes.

15. The method as defined in claim 13, wherein said emphasizing comprises highlighting or lengthening said scale mark.

16. The method as defined in claim 13, further comprising storing speed limit values for roads and streets of said digital map in a storage device located in the vehicle and wherein said obtaining of said current speed limit comprises retrieving at least one of said speed limit values from said storage device.

17. The method as defined in claim 16, further comprising updating said speed limit values stored in said storage device by means of a radio connection or a data carrier.

18. The method as defined in claim 13, wherein said region is a state, county or city area.

19. The method as defined in claim 13, wherein said display device includes means for displaying other different speed scales besides said vehicle speed scale and means for selecting one of said speed scales for display on the display device in order to indicate said actual vehicle speed.

20. The method as defined in claim 19, wherein said one of said speed scales selected for display is selected so that a scale end value depends on said current speed limit.

21. A method of displaying speed information in a vehicle, said method comprising the steps of:
- a) providing in the vehicle a display device for displaying vehicle speed, said display device including means for displaying a selected one of a plurality of different vehicle speed scales, means for automatically selecting one of said different speed scales for display on the display device and a painter cooperating with said selected one of said plurality of different vehicle speed scales displayed on the display device to indicate an actual vehicle speed of the vehicle;
- b) determining a current actual position of the vehicle with a positioning device located in the vehicle;
- c) locating the current actual position of the vehicte determined in stop b) on a digital map;
- d) identifying a region in which the current actual position of the vehicle is located;
- e) storing speed limit values for roads and streets of said digital map in a storage device located in the vehicle;
- f) retrieving at least one of said speed limit values from said storage device to obtain a current speed limit for said vehicle according to one of said roads or one of said streets in said region on which said vehicle is currently located and according to characteristics of said vehicle;
- g) automatically selecting said selected one of said vehicle speed scales for display of the vehicle speed so that a scale end value depends on said current speed limit; and h) indicating the actual vehicle speed on said one of said vehicle speed scales selected in step g) by means of said pointer wherein said characteristics of said vehicle comprise vehicle weight, vehicle engine size and towed trailer characteristics when said trailer is towed by said vehicle.

22. The method as defined in claim 21, further comprising generating at least one of an acoustic warning signal and an optical warning signal when said current speed limit changes.

23. The method as defined in claim 21, further comprising updating said speed limit values stored in said storage device by means of a radio connection or a data carrier.

24. A method of displaying speed information in a vehicle, said method comprising the steps of:
   a) determining a current actual position of the vehicle with a positioning device;
   b) locating the current actual position of the vehicle determined in step a) on a digital map;
   c) identifying one of a plurality of governmental regions in which the current actual position on the digital map Is located, wherein physical units for vehicle speed values and speed limit values are the same within each of said governmental regions but change when traveling between at least two of said governmental regions;
   d) displaying automatically on a display device at least one of an actual current speed of the vehicle and a speed limit for at least one type of road or street in said one of said governmental regions in said physical units for the speed values used in said one of said governmental regions; and
   e) when at least one of said actual current speed of the vehicle and said speed limit is displayed, generating at least one of an acoustic warning signal and an optical warning signal, it said physical units for the speed values change when said vehicle travels from said one of Mid governmental regions to another at said governmectal regions.

25. The method as defined in claim 24, wherein each of said governmental regions is a state, country or city area.

26. The method as defined in claim 24, wherein said display device for said displaying said at least one of said actual current speed of the vehicle and said speed limit for said at least one type of road or street in said one of said governmental regions comprises a freely programmable combined instrument.

27. The method as defined in claim 24, further comprising displaying at least one speed scale (103, 113, 123) for actual speed values on said display device and highlighting or emphasizing said speed limit for said at least one type of road or street on said at least one speed scale.

28. The method as defined in claim 24, further comprising storing values for said speed limit for said at least one type of road or street in said region in said vehicle and then updating said values of said speed limit for said at least one type of road or street in said region by means of a radio connection or by means of date carrier.

29. The method as defined in claim 24, said displaying of said at least one of said actual current speed of the vehicle and said speed limit for at least one type of road or street occurs according to type, characteristics and conditions of said vehicle.

30. The method as defined in claim 29, wherein said type, characteristics and conditions of said vehicle include vehicle weight, vehicle engine size and trailer characteristics, when said vehicle is towing a trailer.

31. The method as defined in claim 24, further comprising determining said at least one type of said road or street on which said vehicle is currently located from said location on said digital map and wherein said displaying of said actual current speed of the vehicle and said speed limit takes place according to said at least one type of said road or street determined during said determining of said at least one type of said road or street.

32. A method of displaying speed information in a vehicle, said method comprising the steps of:
   a) determining a current actual position of the vehicle with a positioning device located in the vehicle;
   b) locating the current actual position of the vehicle determined in step a) on a digital map;
   c) identifying a respective one of a number of different possible governmental regions in which the current actual position of the vehicle is located, wherein physical units for vehicle speed values and speed limit values are the same within each of said governmental regions, but change when traveling between at least two of said governmental regions;
   d) providing a display device in the vehicle for displaying vehicle speed, said display device including means for displaying a selected one of a plurality of different vehicle speed scales including speed scales in said different physical units, means for automatically selecting one of said different vehicle speed scales on the display device according to said respective one of said governmental regions in which said vehicle is currently located and a pointer cooperating with a selected one of said different vehicle speed scales displayed on the display device to indicate a current actual speed of the vehicle;
   e) obtaining a current speed limit for said vehicle according to a road or street in said governmental region on which said vehicle is currently located and optionally according to characteristics of said vehicle;
   f) automatically selecting said selected one of said different speed scales for display of the vehicle speed according to said respectIve one of said governmental regions in which said vehicle is currently located with said means for automatically selecting provided in step d) and so that a scale end value depends on said current speed limit;
   g) displaying said selected one of said different speed scales on said display device;
   h) emphasizing a scale mark on said selected one of said vehicle speed scales in order to indicate the current speed limit; and
   i) indicating the current actual speed on said selected one of said vehicle speed scales by means of said pointer.

33. The method as defined in claim 32, wherein each of said governmental regions is a state, country or city area.

34. The method as defined in claim 32, wherein said display device for displaying vehicle speed comprises a freely programmable combined instrument for showing the current actual speed and the current speed limit.

35. The method as defined in claim 32, further comprising storing speed limit values for roads and streets of said digital map in a storage device located in the vehicle and wherein said obtaining of said current speed limit comprises retrieving at least one of said speed limit values from said storage device.

36. The method as defined in claim 35, further comprising updating said speed limit values for roads or streets of said digital map by means of a radio connection or by means of a data carrier.

37. The method as defined in claim 32, wherein said displaying of said current actual speed of said vehicle and said current speed limit occurs according to the characteristics, type and conditions for said vehicle.

38. The method as defined in claim 37, wherein said characteristics of said vehicle include vehicle weight, vehicle engine size and trailer characteristics, when said vehicle is towing a trailer.

39. The method as defined in claim 32, further comprising identifying said road or street on which said vehicle is currently located from said current actual position on said digital map.

40. A method of displaying speed information in a vehicle, said method comprising the steps of:
   a) providing a display device in the vehicle for displaying vehicle speed, said display device including means for displaying a selected one of a plurality of different vehicle speed scales, means for automatically selecting one of said different speed scales for display on the display device and a pointer cooperating with said selected one of said plurality of different vehicle speed scales displayed on the display device to indicate an actual vehicle speed of the vehicle;
   b) determining a current actual position of the vehicle with a positioning device located in the vehicle;
   c) locating the current actual position of the vehicle determined in step b) on a digital map;
   d) identifying a region in which the current actual position of the vehicle is located;
   e) obtaining a current speed limit for said vehicle according to a road or street in said region on which said vehicle is currently located and according to characteristics of said vehicle;
   f) automatically selecting said selected one of said different speed scales according to said characteristics of said vehicle and said region in which said vehicle is located;
   g) displaying said selected one of said vehicle speed scales so that a scale end value depends on said current speed limit; and
   h) indicating the actual vehicle speed on said selected one of said vehicle speed scales selected in step g) by means of said pointer;

wherein said characteristics of said vehicle comprise vehicle weight, vehicle engine size and towed trailer characteristics when said trailer is towed by said vehicle.

41. The method as defined in claim 40, further comprising generating at least one of an acoustic warning signal and an optical warning signal when said current speed limit changes.

42. The method as defined in claim 40, further comprising storing speed limit values for roads and streets of said digital map in a storage device located in the vehicle and wherein said obtaining of said current speed limit comprises retrieving at least one of said speed limit values from said storage device.

43. The method as defined in claim 42, further comprising updating said speed limit values stored in said storage device by means of a radio connection or a data carrier.

\* \* \* \* \*